Sept. 19, 1967  A. P. SINJAVSKY ETAL  3,342,351
DEVICE FOR AUTOMATIC CHARGING OF DEFIBRER
MAGAZINES WITH PULPWOOD
Filed Oct. 15, 1964  2 Sheets-Sheet 2

United States Patent Office 3,342,351
Patented Sept. 19, 1967

3,342,351
DEVICE FOR AUTOMATIC CHARGING OF DEFIBRER MAGAZINES WITH PULPWOOD
Adolif Pinkhusovich Sinjavsky and Victor Alexandrovich Bedeker, Leningrad, and Vera Nickolaevna Dormidontova, administrator of Nickolai Ivanovich Dormidontov, deceased, Leningrad, U.S.S.R., assignors to Bumazhnaja Fabrika, Leningrad, U.S.S.R.
Filed Oct. 15, 1964, Ser. No. 404,561
8 Claims. (Cl. 214—16)

The present invention relates to devices for automatic charging of defibrer magazines with pulpwood.

It is known to charge defibrer magazines with pulpwood by the use of devices comprising a horizontal charging conveyer disposed over the magazines, a feed conveyer receiving pulpwood from the barking unit and transferring it to the horizontal conveyer, a guide frame with outlets and gates arranged in the form of horizontal plates, an automatic charge control, a device for transferring pulpwood onto the upper strand of the horizontal conveyer and dampers for stacking up pulpwood in the magazines. The automatic charge control employed in these devices includes counting elements interacting with actuating elements.

The device for transferring woodpulp onto the upper strand of the horizontal conveyer is a mechanism composed of additional horizontal conveyers and an elevator with appropriate drives and sensors to control their operation. The dampers for stacking up pulpwood in the magazines are made in the form of horizontal plates fitted with counterweights and mounted in the magazines.

Said devices are deficient in that their automatic charge control is too complicated owing to the fact that variation in the speed of the feed conveyer is dependent on the output per unit time of the barking unit.

Another drawback to said devices is uneven distribution of pulpwood between the magazines, pulpwood feed varying with the speed of the feed conveyer and amount of pulpwood carried by this conveyer onto the charging conveyer in unit time.

Another disadvantage of said devices is sticking of pulpwood between the pushers of the horizontal conveyer and the edges of the guide frame outlets due to the gates being actuated to close while pulpwod is present thereon.

A further disadvantage of said devices is too complicated an arrangement of the mechanism whereby the pulpwood left after charging all the magazines is transferred onto the upper strand of the charging conveyer.

The present invention has for its object to provide a simple and dependable device for automatic charging of defibrer magazines with pulpwood.

Another object of this invention is to provide for even distribution of pulpwood between the magazines irrespective of the speed of the feed conveyer and the amount of pulpwood supplied by the barking unit onto the feed conveyer per unit time, as well as to ensure proper stacking up of pulpwood in the magazines.

A further object of this invention is to preclude sticking of pulpwood between the pushers of the horizontal conveyer and the edges of the guide frame outlets.

One more object of this invention is to simplify the arrangement of the mechanism for transferring onto the upper strand of the horizontal conveyer the spare pulpwood left on the guide frame after all the magazines have been charged.

According to the present invention, the device for automatic charging of defibrer magazines with pulpwood comprises an automatic charge control composed of sensors located in the magazines to register a preset level of pulpwood therein, and actuating mechanism receiving signals from said sensors and interacting with the gates. Incorporated between said pulpwood level sensors and actuators are a logical element, for example a motor driven relay selector, actuating in response to the signals from the pulpwood level sensors, and valves connected with the logical element and transmitting the signals to the actuators.

To obtain uniform distribution of pulpwood between the magazines irrespective of the speed of the feed conveyer and the amount of pulpwood supplied by the barking unit onto the feed conveyer per unit time, as well as to obtain proper stacking up of pulpwood in the magazines, provision is made of reversing distributors which are disposed over the magazine openings, controlled by the pulpwood level sensors and serve to direct supply of pulpwood to the left and right sides of the magazines. With this arrangement, the dampers are positioned centrally with respect to each magazine and are each made in the form of two sloping plates whose upper ends are jointed by the pivots, whereas the lower ends are brought into contact with the magazine walls by some means, for example with the aid of counterweights.

To preclude sticking of pulpwood between the pushers of the horizontal conveyer and the edges of the guide frame outlets, the gates are fitted with sensors which are inserted into the actuator circuit and serve to cancel the signals for opening the relevant gate while pulpwood is passing thereover.

To simplify the mechanism whereby the pulpwood left after charging is transferred from the guide frame onto the upper strand of the horizontal conveyer, a switch is provided on the guide of the horizontal conveyer upper strand, which switch is inserted in the actuator circuit and designed to disengage the feed conveyer in case the upper strand of the horizontal conveyer is carrying pulpwood transferred from the guide frame by means of the cable-and-spring mechanism arranged at the end of said guide frame.

For a further understanding of the present invention, an embodiment thereof is depicted in the accompanying drawings, wherein.

Figure 6:
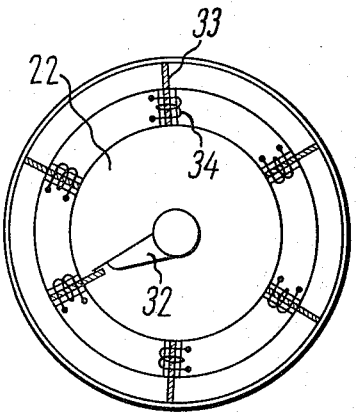
Figure 5:
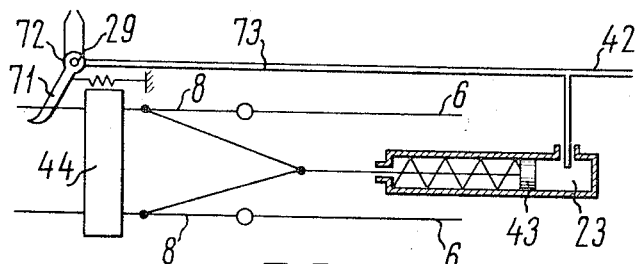

FIG. 5 diagrammatically shows operation of the senser cancelling signals for opening slide gates; and FIG. 6 is a schematic diagram of the motor driven relay selector.

Figure 1:
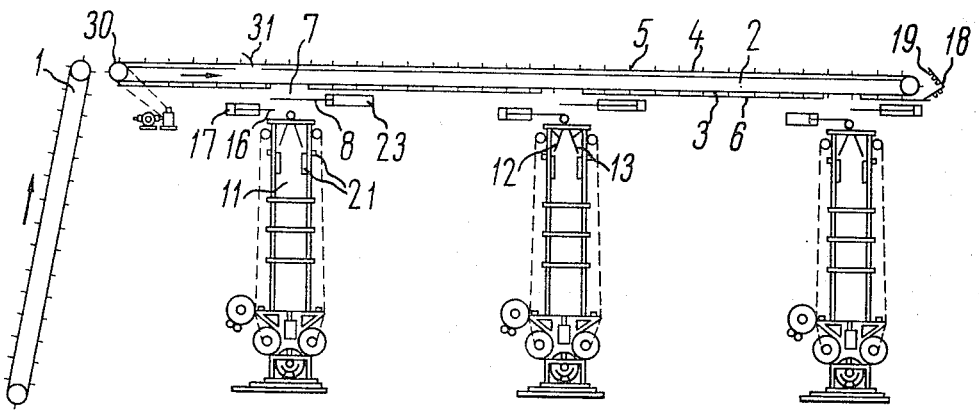
FIG. 1 is a side view showing the layout of the invention.

The device for charging defibrer magazines with pulpwood comprises a feed conveyor 1 (FIG. 1) which receives pulpwood from the barking unit (not shown in the drawing) and transfers it onto a horizontal charging conveyor 2 arranged with two working strands 3 and 4 having pushers 5. The horizontal charging conveyor 2 is mounted over a guide frame 6 having outlets 7. The outlets 7 are fitted with gates 8 in the form of levers 9 and 10 (FIG. 2) articulated to the guide frame 6.

Under the guide frame 6, opposite the outlets 7, are disposed defibrer magazines 11. Mounted in the upper portion of each magazine 11 is a damper composed of two sloping plates, viz. the left-hand plate 12 and the right-hand plate 13, which are each fitted with a counterweight and connected to each other at their upper ends by a pivot 14 located centrally with respect to magazines 11, while their lower ends are urged against the walls of the magazine.

Located between the top ends of the magazines 11 and the bottom sides of the gates 8 are reversing distributors in the form of plates 16 which partially close the inlet openings of the magazines 11 and are actuated by pneumatic cylinders 17. Pulpwood moves past the plates 16 and is deposited either on the left-hand plate or on the right-hand plate in accordance with the two extreme positions of the plate 16. If the edge of the plate 16 coincides with the center of the magazine the pulpwood is deposited on the plate 13, i.e. to the right-hand wall of the magazine. If the plate 16 occupies the other position, i.e. its edge coincides with that of the magazine, the plupwood is deposited onto the plate 12, i.e, to the left-hand wall of the magazine.

Mounted at the end of the guide frame 6 is a cable-and-spring mechanism which serves to transfer pulpwood from the guide frame 6 on the upper strand 4 of the horizontal charging conveyor 2 and is composed of parallel cables 18 fitted with springs 19 and attached to a frame 20.

Figure 2:
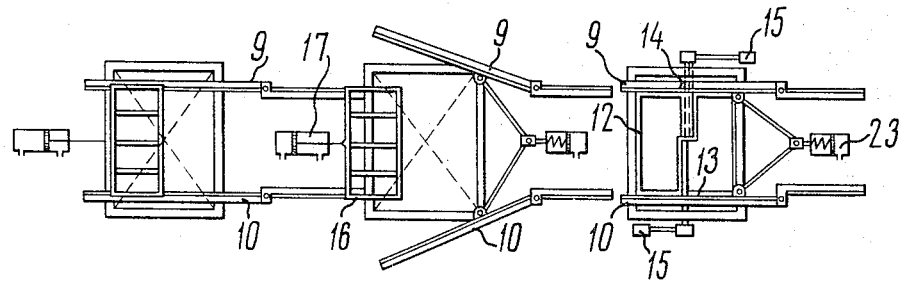
FIG. 2 is a top view showing the layout of the invention.
Figure 3:
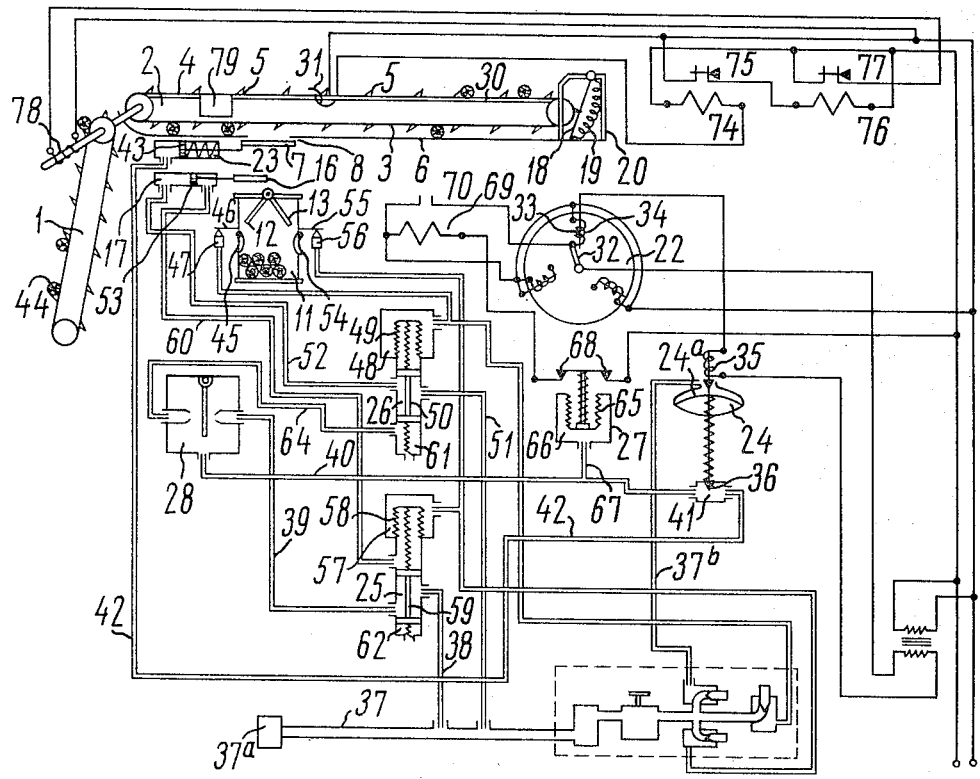
FIG. 3 is a schematic diagram of the electropneumatic automatic control of the invention.

The device is governed by an automatic charging control. The latter comprises sensers 21 (FIG. 1) located in the magazines 11 and serving to measure the preset level of pulpwood in same and to send signals to the reversing distributor pneumatic cylinders 17 and to the selector 22 (FIGS. 3, 6). The selector 22 sends signals to pneumatic cylinders 23 interacting with the gates 8 of the outlets 7. The structure of the gates 8 is shown in FIG. 2. It comprises the two levers 9 and 10 controlled by the pneumatic cylinder 23 the rod of which, by means of two ties, is pivotably connected to said levers. The gates (see FIG. 1) may be made in the form of a slide valve articulated to the pneumatic cylinder 23. The function of these gates is to open or to close the outlets 7 in the guide frame 6 for directing the pulpwood into the corresponding magazine, or to transfer the pulpwood onto the next magazine.

Incorporated between the selector 22 and the pneumatic cylinders 17 and 23 are pneumatic valves 25 and 26, pneumoelectrical relay 27 and pneumatic regulators 28 functioning as intermediate relays.

The gates 8 mount sensors 29 (FIG. 5) which cancel the signals for opening the outlets 7 if there is pulpwood on the appropriate gate.

The guide 30 (FIGS. 1 and 3) of the horizontal conveyer upper strand 4 mounts a switch 31 intended to disengage the sloping feed conveyer 1 in the event there is pulpwood on the upper strand 4 of the horizontal conveyer 2.

The device for automatic charging of defibrer magazines with pulpwood operates in the following manner.

The dog 32 of the selector 22 is driven by an electric motor through a friction clutch (not shown in the drawing). During its travel the dog 32 contacts the core 33 projecting from the solenoid 34, thereby closing the circuit of electromagnet 35 incorporated in the electropneumatic valve 24. With this condition satisfied, the electromagnet 35 lifts the needle 36 of the valve 24. The air passes from manifold 37 through air line 38 into the pneumatic valve 25 and thence through air line 39, pneumatic regulator 28 and air line 40 into the chamber 41 of the electropneumatic valve 25. From the chamber 41 the air passes through air line 42 into the pneumatic cylinder 23 and forces the piston 43 of the pneumatic cylinder 23 to move to the right, thereby opening the gate 8 of the outlet 7.

Now the feed conveyer 1 commences delivering pulpwood 44 onto the guide frame 6. The pushers 5 move the pulpwood 44 to the open outlet 7 and the pulpwood falls down into the magazine 11 towards its left side.

When the left side of the magazine 11 has been filled up to the preset level, the pulpwood depresses the lever 45 of the left-side senser 21. This causes flap 46 to open, permitting orifice 47 to bring the chamber 48 of the pneumatic valve 26 into communication with the atmosphere.

The bellows 49 of the valve 26 expands and lifts piston 50 in the valve 26. The air passes from the manifold 37 through air line 51, valve 26 and air line 52 into the left-hand chamber of the pneumatic cylinder 17 and forces piston 53 to move, thereby causing the plate 16 of the reversing distributor to shift to the right and close the entrance into the left side of the magazine. With this condition satisfied, the pulpwood continues to pass into the right side of the magazine. When the right side of the magazine has been filled to the preset level, the pulpwood depresses the lever 54 of the right-hand senser 21, whereby flap 55 is opened and orifice 56 is permitted to bring the chamber 57 of the pneumatic valve 25 into communication with the atmosphere.

The bellows 58 of the valve 25 expands and lifts the piston 59 in the valve 25. The air passes from the manifold 37 through the air line 38, valve 25 and air line 60 into the right-hand chamber of the pneumatic cylinder 17, into whose left-hand chamber the air also passes in the above described manner. Under these conditions the plate 16 of the reversing distributor remains stationary. With the pistons 50 and 59 in the aforementioned position, the chambers 61 and 62 of the valves 26 and 25 are in communication with the atmosphere.

The piston 43 actuated by the spring 63 forces the air out of the pneumatic cylinder 23 and thence through the air line 42, chamber 41 of the valve 24, air line 40, regulator 28, air lines 39 and 64 and chambers 61 and 62 of the valves 25 and 26 into the atmosphere.

The bellows 65 expands, closing the contacts 68 in the circuit of relay 69. The relay 69 operates, the relay contact 70 closes the circuit and energizes the solenoid 34. The solenoid 34 pulls in the core 33, releasing the dog 32 of the selector 22. The dog 32, on its further rotating movement, contacts the next appropriate core to take the control over charging of an empty magazine and the cycle is repeated.

At the commencement of the next cycle the selector 22 sends a signal for closing the gate 8 of the outlet 7 over the subsequent magazine. The gate opens, provided there is no pulpwood thereon.

If pulpwood is present on the gate 8 at the moment a signal is being sent for opening said gate, the pulpwood depresses the spring-loaded lever 71 (FIG. 5) of the sensor 29 located on the lever 9 of the gate 8. The lever 71 opens valve 72 connected with the pneumatic cylinder 23 through air line 73. Opening the valve 72 puts the pneumatic cylinder 23 in communication with the atmosphere and the signal for opening the slide gate is cancelled for the entire period of time the pulpwood is passing over the gate. After the valve has become free of the pulpwood, the associated senser 29 is operative, and its chamber will close the outlet before the given command to open the outlets will arrive in the pneumatic cylinder 23, and the levers 9 and 10 will open the outlet 7.

Figure 4:
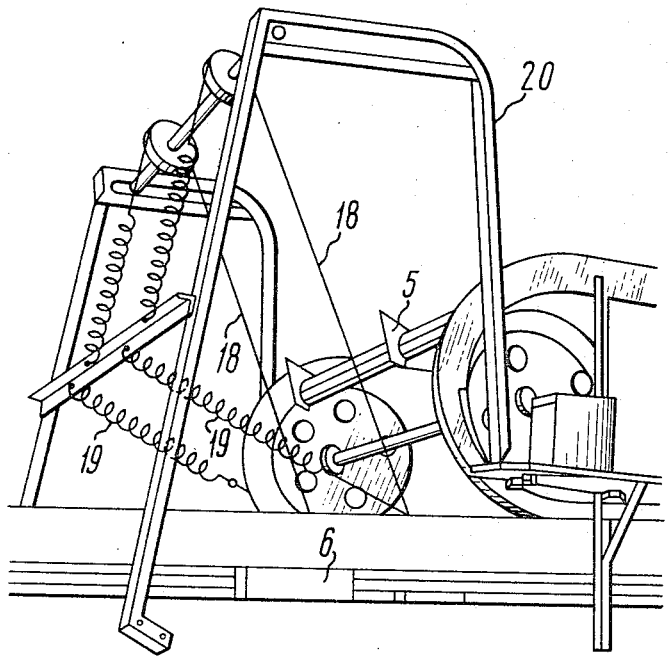
FIG. 4 shows the cable-and-spring mechanism.

After all the magazines have been filled with pulpwood, the stock left on the guide frame 6 is transferred onto the upper strand 4 of the horizontal conveyor 2. More particularly, FIG. 4 shows a part of the guide frame 6 (fully shown in FIG. 1). Pulpwood 44 is moved along the upper strand 4 by pushers 5 of the charging conveyor 2. (The upper strand 4 is fully shown in FIG. 1 and the pulpwood 44 in FIG. 3.) Pulpwood of any diameter from 50 to 350 mm. moved by the pushers 5 encounters the cables 18 and further on due to the fact that the conveyor 2 goes along the pulpwood is raised by the same pushers 5 onto the upper strand 4. The cables 18 support the pulpwood thus preventing it from falling down. To provide transferring of pulpwood along pushers 5 onto the upper strand of the charging conveyor, the cables 18 pass over small sprockets and are either acted on by springs 19 or by a counter-weight (not shown in the drawings).

Moving over the upper strand 4 of the horizontal conveyer 2, the pulpwood contacts the switch 31 which closes the circuit of relay 74 with the result that the relay 74 operates and opens the normally closed contact 75, thereby opening the circuit of relay 76. This causes contact 77 to close, whereby the electromagnet 78 of the clutch (not shown on the drawing) becomes energized and the feed conveyer 1 is disengaged. The pulpwood passes from the upper strand 4 of the horizontal conveyer 2 through opening 79 onto the guide frame 6 and thence is carried by the pushers 5 of the horizontal conveyer lower strand 3 into the magazine due to be charged. After the horizontal conveyer upper strand 4 has become free of all pulpwood, the relay 74 operates and closes the contact 75. This brings the relay 76 into operation with resultant opening of the contact 77, due to which the electromagnet becomes de-energized and releases the clutch, thus permitting it to engage the feed conveyer 1.

What is claimed is:

1. A device for automatic charging of defibrer magazines with pulpwood, comprising:
 a feed conveyer,
 a guide frame onto which pulpwood is passed from said feed conveyer,
 said guide frame having outlets over defibrer magazines,
 gates to close said outlets when the magazines have been filled up to a preset level,
 a charging conveyer to pass pulpwood over the guide frame to said outlets,
 pulpwood level sensors in the magazines to register the preset level of pulpwood,
 actuators for operating said gates in response to signals from said pulpwood level sensors, and
 reversing distributors for receiving signals from said pulpwood level sensors to direct delivery of pulpwood to either a right-hand or a left-hand side of the magazines.

2. A device for automatic charging of defibrer magazines with pulpwood comprising:
 a feed conveyer,
 a guide frame onto which pulpwood is passed from said feed conveyer,
 said guide frame having outlets over defibrer magazines,
 dampers in said magazines to receive pulpwood passing through said outlets,
 gates to close said outlets when the magazines have been filled up to a preset level,
 a charging conveyer to pass pulpwood over the guide frame to said outlets,
 pulpwood level sensors in the magazines to register the preset level of pulpwood,
 actuators for operating said gates in response to signals from said pulpwood level sensors, and
 reversing distributors for receiving signals from said pulpwood level sensors to direct delivery of pulpwood to either a right-hand or a left-hand side of the magazines.

3. A device for automatic charging of defibrer magazines with pulpwood, comprising:
 a feed conveyer,
 a guide frame onto which pulpwood is passed from said feed conveyer, said guide frame having outlets over defibrer magazines, dampers in said magazines to receive pulpwood passing through said outlets,
 gates to close said outlets when the magazines have been filled up to a preset level,
 a charging conveyor to pass pulpwood over the guide frame to said outlets,
 pulpwood level sensors in the magazines to register the preset level of pulpwood,
 actuators for operating said gates in response to signals from said pulpwood level sensors,
 a logical element receiving signals from said pulpwood level sensors, and
 reversing distributors for receiving signals from said pulpwood level sensors to direct delivery of pulpwood to either a right-hand or a left-hand side of the magazines.

4. A device for automatic charging of defibrer magazines with pulpwood, comprising:
 a feed conveyer,
 a guide frame onto which pulpwood is passed from said feed conveyer,
 said guide frame having outlets over defibrer magazines,
 dampers in the magazines to receive pulpwood passing through said outlets,
 gates to close said outlets when the magazines have been filled up to a preset level,
 a charging conveyer to pass pulpwood over the guide frame to said outlets,
 pulpwood level sensors in the magazines to register the preset level of pulpwood,
 actuators for operating said gates in response to signals from said pulpwood level sensors,
 a motor-driven relay selector between said pulpwood level sensors and said acuators and receiving signals from said pulpwood level sensors,
 valves receiving signals from said motor-driven relay selector and transmitting said signals to the actuators operating the gates, and
 reversing distributors for receiving signals from said pulpwood level sensors to direct delivery of pulpwood to either a right-hand or a left-hand side of the magazine.

5. A device for automatic charging of defibrer magazines with pulpwood, comprising:
 a feed conveyer,
 a guide frame onto which pulpwood is passed from said feed conveyer,
 said guide frame having outlets over defibrer magazines,
 dampers in the magazines to receive pulpwood passing through said outlets,
 gates to close said outlets when the magazines have been filled up to a preset level,
 a charging conveyer to pass pulpwood over the guide frame to said outlets,
 pulpwood level sensors in the magazines to register the preset level of pulpwood,
 actuators for operating said gates in response to signals from said pulpwood level sensors,
 a logical element between the pulpwood level sensors and the actuators and receiving signals from said pulpwood level sensors,
 valves receiving signals from said logical element and transmitting said signals to the actuators operating the gates,
 reversing distributors for receiving signals from said pulpwood level sensors to direct delivery of pulpwood to either a right-hand or a left-hand side of the magazines, and
 sensors on the gates to cancel signals for opening said gates while pulpwood is passing thereover.

6. A device for automatic charging of defibrer magazines with pulpwood, comprising:
 a feed conveyer,
 a guide frame onto which pulpwood is passed from said feed conveyer,
 said guide frame having outlets over defibrer magazines,
 dampers in the magazines to receive pulpwood passing through said outlets,
 gates to close said outlets when the magazines have been filled up to a preset level,
 a charging conveyer to pass pulpwood over the guide frame to said outlets,
 pulpwood level sensors in the magazines to register the preset level of pulpwood,
 actuators for operating said gates in response to signals from said pulpwood level sensors,
 a logical element between the pulpwood level sensors and the actuators and receiving signals from said pulpwood level sensors, valves receiving signals from said logical element and transmitting said signals to the actuators operating the gates, reversing distributors for receiving signals from the said pulpwood level sensers to direct delivery of pulpwood to either a right-hand or a left-hand side of the magazines, sensers on the gates to cancel signals for opening said gates while pulpwood is passing thereover, and a cable-and-spring mechanism mounted at the end of the guide frame and intended to pass pulpwood from said guide frame onto the upper strand of the charging conveyer after all the magazines have been charged.

7. A device for automatic charging of defibrer magazines with pulpwood, comprising:

a feed conveyer, a guide frame onto which pulpwood is passed from said feed conveyer, said guide frame having outlets over defibrer magazines, dampers in the magazines to receive pulpwood passing through said outlets, gates to close said outlets when the magazines have been filled up to a preset level, a charging conveyer to pass pulpwood over the guide frame to said outlets, pulpwood level sensers in the magazines to register the preset level of pulpwood, actuators for operating said gates in response to signals from said pulpwood level sensers, a logical element between the pulpwood level sensers and the actuators and receiving signals from said pulpwood level sensers, valves receiving signals from said logical elements and transmitting said signals to the actuators operating the gates, reversing distributors for receiving signals from said pulpwood level sensers to direct delivery of pulpwood to either a right-hand or a left-hand side of the magazines, sensers on the gates to cancel signals for opening said gates while pulpwood is passing thereover, a cable-and-spring mechanism mounted at the end of the guide frame and intended to pass pulpwood from said guide frame onto the upper strand of the charging conveyer after all the magazines have been charged, and a switch on the upper strand of the charging conveyer to disengage the feed conveyer when pulpwood is present on said upper strand of said charging conveyer.

8. A device for automatic charging of defibrer magazines with pulpwood, comprising:

a feed conveyer, a guide frame onto which pulpwood is passed from said feed conveyer, said guide frame having outlets over defibrer magazines, dampers in the magazines, mounted centrally with respect to said magazines and including sloping plates having upper ends which are pivotally connected and lower ends which are brought into contact with the walls of the magazines, said dampers being adapted to receive pulpwood passing through said outlets, gates to close said outlets when the magazines have been filled up to a preset level, a charging conveyer to pass pulpwood over the guide frame to said outlets, pulpwood level sensers in the magazines to register the preset level of pulpwood, actuators for operating said gates in response to signals from said pulpwood level sensers, a motor driven relay selector between the pulpwood level sensers and the actuators and receiving signals from said pulpwood level sensers, valves receiving signals from said motor driven relay selector and transmitting said signals to the actuators operating the gates, reversing distributors for receiving signals from said pulpwood level sensers to direct delivery of pulpwood to either a right-hand or a left-hand side of the magazines, sensers on the gates to cancel signals for opening said gates while pulpwood is passing thereover, a cable-and-spring mechanism mounted at the end of the guide frame and intended to pass pulpwood from said guide frame onto the upper strand of the charging conveyer after all the magazines have been charged, and a switch on the upper strand of the charging conveyer to disengage the feed conveyer when pulpwood is present on said upper strand of said charging conveyor.

References Cited

UNITED STATES PATENTS

| | | | |
|---|---|---|---|
| 1,863,028 | 6/1932 | Pardee | 193—32 |
| 2,311,747 | 2/1943 | Gooch | 198—169 X |
| 2,614,707 | 10/1952 | Bilterman | 214—17 |
| 2,627,356 | 2/1953 | Bell | 214—17 X |

ROBERT G. SHERIDAN, *Primary Examiner.*